(No Model.)

T. R. TIMBY.
HEAT AND POWER SUPPLY SYSTEM.

No. 379,744. Patented Mar. 20, 1888.

Witnesses.
F. L. Ourand.
M. L. Williams.

Inventor.
Theodore R. Timby.
By his Attorney.
Wallace A. Bartlett.

(No Model.) 2 Sheets—Sheet 2.
T. R. TIMBY.
HEAT AND POWER SUPPLY SYSTEM.
No. 379,744. Patented Mar. 20, 1888.
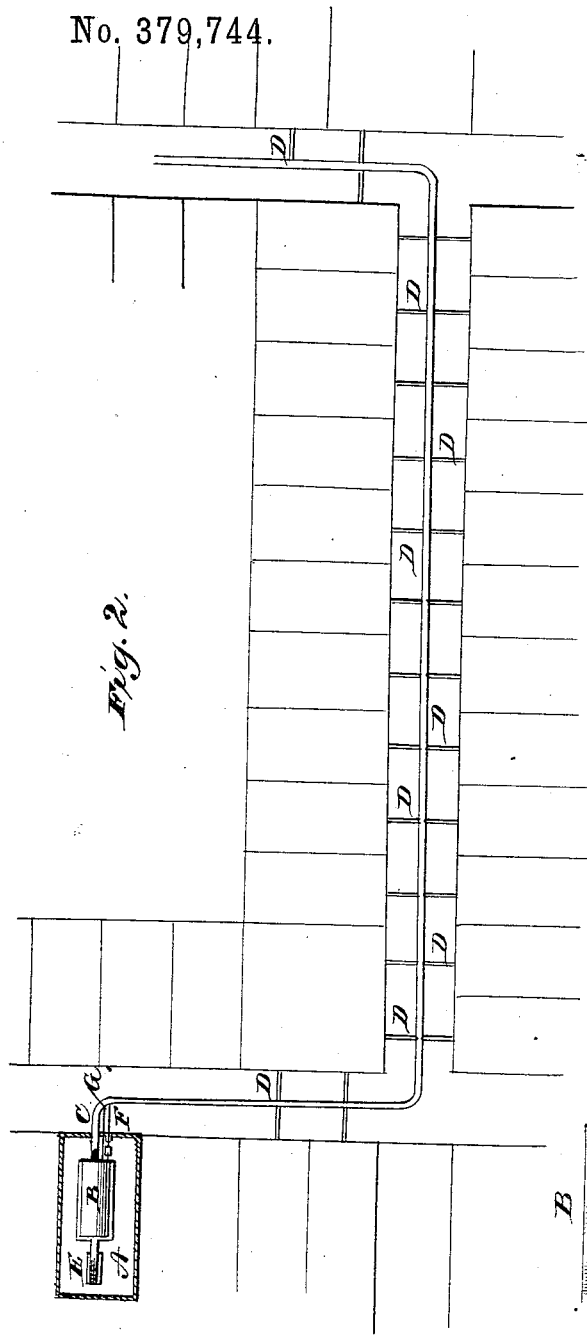
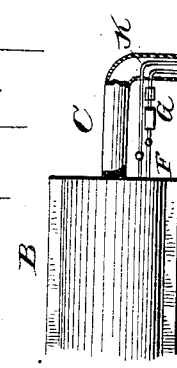
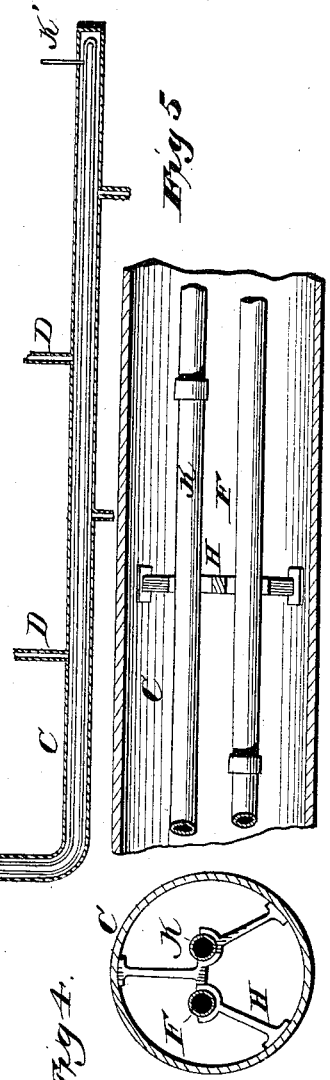
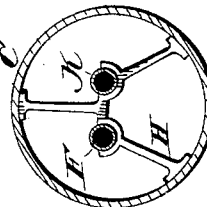
Witnesses.
F. L. Ourand.
M. L. Williams.
Inventor.
Theodore R. Timby.
By his Attorney,
Wallace A. Bartlett.

UNITED STATES PATENT OFFICE.

THEODORE R. TIMBY, OF WASHINGTON, DISTRICT OF COLUMBIA, ASSIGNOR OF ONE-HALF TO CHRISTIAN G. SCHNEIDER, OF SAME PLACE.

HEAT AND POWER SUPPLY SYSTEM.

SPECIFICATION forming part of Letters Patent No. 379,744, dated March 20, 1888.

Application filed May 3, 1887. Serial No. 236,967. (No model.)

*To all whom it may concern:*

Be it known that I, THEODORE R. TIMBY, residing at Washington, in the District of Columbia, have invented certain new and useful Improvements in Heat and Power Supply Systems, of which the following is a specification, reference being had therein to the accompanying drawings.

This invention relates to a system of heating and furnishing power, especially intended for a large area, as a city or portion of a city, but applicable also to a single building.

The object of the invention is to furnish a sufficient and equable supply of heated air to houses at a small cost.

The invention consists in the special apparatus for supplying heated air and keeping the air at a high temperature in a city supply.

Figure 1:
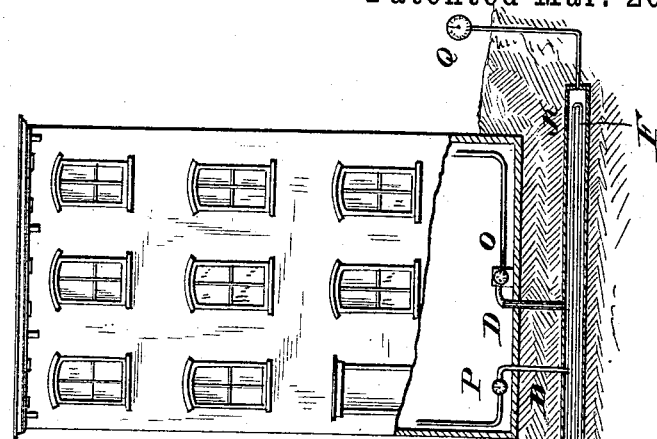
Figure 1:
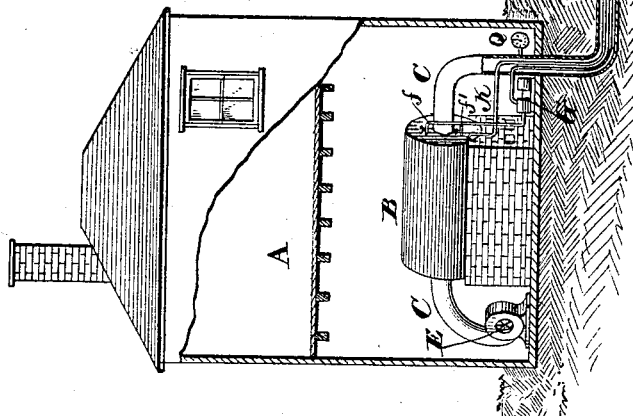

In the drawings Figure 1 is an elevation, partly sectioned, of a building constituting the central station of a system, and a house connected with the pipe-line. Fig. 2 is a diagram indicating the plan of a station and its pipe-connection with various buildings along a city street. Fig. 3 is an enlarged section of a street-main and a plan of the connections to the steam-boiler. Fig. 4 is a cross-section of a main and its interior heating-pipes. Fig. 5 is a horizontal section of same.

The salient feature of my invention is that each building in the circuit shall receive a supply of hot air, which air shall be heated partly or wholly by steam or hot water, and not generally by direct combustion or radiation from surfaces heated to a high temperature, and that the air in the supply-pipes shall be maintained at a uniform temperature by a steam or hot-water supply in close contact with the heated air.

A in the drawings is supposed to represent a heating-station. In this station there is a steam-boiler, B, of any desirable size and kind, or any number of such boilers.

A large air-pipe, C, passes through boiler B and leads from the boiler along the street or through the building to be heated. This pipe C is provided with service-pipes D at such intervals as may be desired. The service-pipes lead into the houses along the line of the main or into the rooms of a single house.

The main C is supplied with air by a blower or compressor, E, of any suitable form and capacity. As the air-pipe passes from the compressor directly through the steam-boiler, the air passing through the pipe will be considerably heated during its passage.

A pipe, F, having steam-connection $f$ and hot-water connection $f'$ with the boiler, leads to a pump or other suitable forcer, G, and thence into the large air-pipe C. The pipe F is supported by a spider, H, inside the pipe C, and passes the full length of the main C. The pipe F connects with a return-pipe, K, also supported within the main pipe C.

Provision may be made for expansion and contraction of the steam or hot-water pipe F by placing return-bends at suitable intervals, or in any other way well known to steam-fitters.

The hot-air pipe C may be protected to prevent loss of heat in any well-known manner, and provision may also be made for expansion and contraction of this pipe.

The service-pipes D lead into the premises to be supplied with heated air, and the amount of air used may be shown by a meter, O, or by a lock and gaged valve, P. A number of pipes may lead into any house, the pipes being of different size, and such pipe only be opened as may be agreed upon.

A pressure-gage, Q, in the supply-station indicates very nearly the average pressure in the air pipe or main C. Other pressure-gages may be placed at different points along the line of the main, and the charges to consumers may be based on the area of the service-pipe open and the average pressure in the main.

As the steam or hot-water pipe goes out and returns through the same main, the temperature of the outgoing pipe will be greater than that of the return-pipe; but the average temperature of the two will be about the same throughout the length of the circuit.

Of course it is immaterial which one of the pipes F or K be used as the supply-pipe; and if hot water be used it will make no difference whether the pump or other forcing apparatus be connected with the outgoing pipe or the return-pipe. The hot water goes round and round in circuit through the boiler and through the pipes F and K, and nothing is lost from these pipes if there be no leakage. The heated air passing through the pipe C is taken out of the service-pipes and used for heating or driving light machinery. The blower or other motor E constantly supplies fresh air to the main to replace that withdrawn from the service-pipes.

It will be understood that the pipe C may pass through as many boilers or furnaces as necessary to bring the air to the required temperature. The steam or hot-water pipes within the main will afterward retain or increase this temperature.

The atmospheric supply will be drawn from some source where the air is clean and pure. Only a moderate pressure in the main will be required.

Cool air may be forced through the main C for power and ventilation when the heat is not required.

The steam or hot-water pipe F or K may be tapped to supply steam or hot water at various points along the line, as at K', Fig. 3; but in this case an additional water-supply must be constantly furnished to the boilers.

I claim—

1. The combination, with an air-supply main, of a heating-pipe extending longitudinally in the main and returning through the same main, thus doubling on itself, and having outflow and inflow sections, both inclosed in the same main, substantially as described.

2. The combination of an air-supply main and an air-propeller for forcing air therein, substantially as described, a hot-water circuit inclosed within the main, and a forcer for maintaining the circulation in the hot-water circuit, as set forth.

3. The combination, with an air-supplying apparatus and means for heating the air, a main, and service-pipes leading therefrom, of a circuit of hot-water pipe contained within the main, and a forcer connected to and maintaining circulation in this circuit.

4. The combination, with an air-main and service-pipes leading therefrom, of a hot-water circuit-pipe inclosed within said main, and a service-pipe leading from the hot-water circuit-pipe to a place of consumption, as set forth.

In testimony whereof I affix my signature in presence of two witnesses.

THEODORE R. TIMBY.

Witnesses:
PHILIP MAURO,
W. A. BARTLETT.